May 4, 1965  W. F. FUNNELL  3,181,675

SHAFT INDEXING DEVICE

Filed Feb. 26, 1962  2 Sheets-Sheet 1

INVENTOR.
WILLIAM F. FUNNELL

BY
*D. Gordon Angus*
ATTORNEY

May 4, 1965  W. F. FUNNELL  3,181,675
SHAFT INDEXING DEVICE

Filed Feb. 26, 1962  2 Sheets-Sheet 2

INVENTOR.
WILLIAM F. FUNNELL

BY
D. Gordon Angus
ATTORNEY

United States Patent Office 3,181,675
Patented May 4, 1965

3,181,675
SHAFT INDEXING DEVICE
William F. Funnell, Glendora, Calif., assignor to Aerojet-General Corporation, Azusa, Calif., a corporation of Ohio
Filed Feb. 26, 1962, Ser. No. 175,845
1 Claim. (Cl. 192—148)

This invention relates to indexing devices for rotating equipment and more particularly to types independent of outside source of power.

An object of this invention is to provide an indexing device which will automatically and reliably stop a rotating shaft in a predetermined position every time the power source which causes the shaft to rotate is cut.

Another object of this invention is to provide an indexing device with a "built-in" power source and stopping means that will bring a rotating shaft to rest in a predetermined position and hold it in this position.

In its broadest aspect, the present invention comprises a shaft rotatable in a housing and having a spiral spring connected thereto with the free end of the spring engaging a friction surface on the housing. When rotational force on the shaft rotating the shaft in one direction is terminated the spring rotates the shaft in a reverse direction at a slow speed. A stopping means is provided between the shaft and the housing for stopping the shaft during its reverse rotation at a predetermined position and thus the shaft is indexed.

Figure 1:
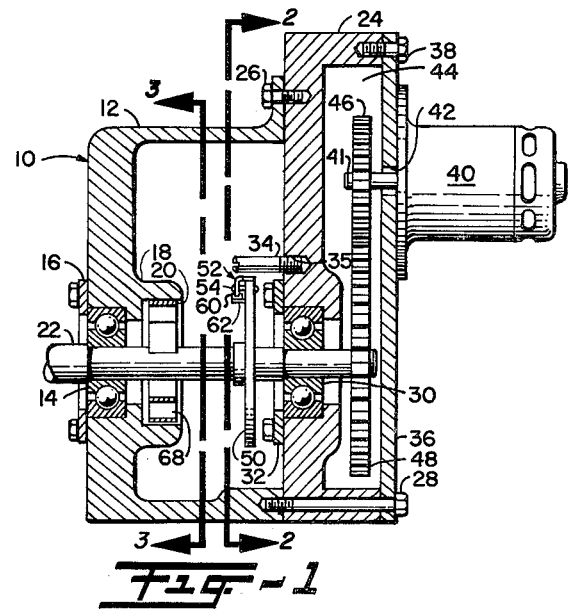
Figure 2:
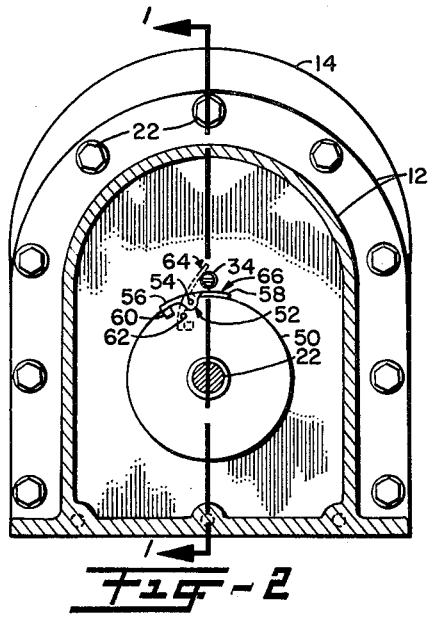
Figure 3:
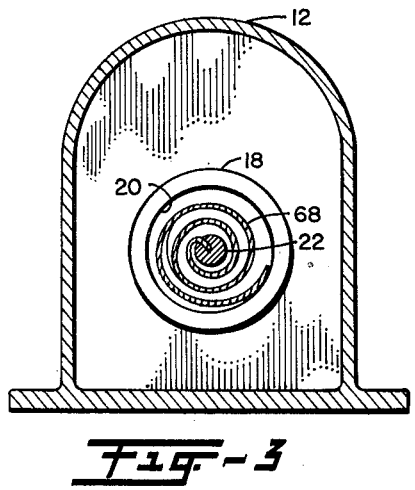
Figure 4:
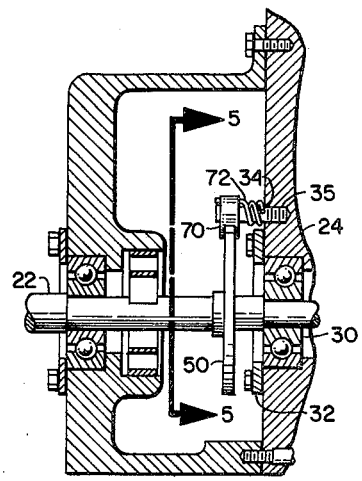
Figure 5:
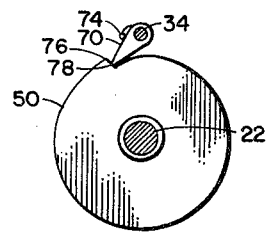

These and other features will be fully understood from the following more detailed description and accompanying drawings of which:

FIGURE 1 is a side view partly in cross section, taken along line 1—1 of FIGURE 2, FIGURE 2 is a sectional view along line 2—2 of FIGURE 1, FIGURE 3 is a sectional view along line 3—3 of FIGURE 1, FIGURE 4 is a fragmentary view of FIGURE 1 showing another embodiment of the invention, and FIGURE 5 is a sectional view along line 5—5 of FIGURE 4.

In FIGURE 1 the arrangement of motor, gears, housing, and bearing are of typical layout and should not limit this invention in any way since they are for illustration purposes only. Their presence, as will be seen, serves to clarify the inventive portion of this invention.

Referring now to FIGURE 1, the indexing device 10 of this invention consists of an indexing housing 12 containing a bearing 14 which is held in place by a bolted bearing retainer plate 16. On the inside of the indexing housing 12 is located a central boss 18 which has a counterbored friction surface 20 opposite the bearing 14. The bearing 14 supports one end of the rotating shaft 22.

A gear case 24 is bolted by means of bolts 26 and 28 to the end of indexing housing 12 opposite the end containing the bearing 14 and central boss 18. Gear case 24 contains another bearing 30, held in place by bolted bearing retainer plate 32, which supports the opposite end of the rotating shaft 22. The gear case 24 also contains a stud or stop member 34 screwed into a drilled and tapped hole 35 on the side facing the central boss 18 of the indexing housing 12.

A cover plate 36 is bolted to the otherwise open end of gear case 24 by bolts 38 and 28. Mounted on the outside of the cover plate 36 is a motor 40 for driving shaft 22. The shaft 41 of motor 40 passes through a hole 42 in the cover plate and has secured to the end of it within the gear case cavity 44 a driving gear 46. Gear 46 meshes with a driven gear 48 secured to the end of shaft 22 within gear case cavity 44. Cavity 44 may have a sealed-in oil supply for the lubrication of the gears 46 and 48.

Mounted on shaft 22 and relatively close to the surface of gear case 24 containing the stud 34 is an indexing disc 50.

As best seen in FIGURE 2, the indexing disc 50 has mounted near its edge a pawl 52. The pawl 52 is pivotally mounted by means of pin 54. End 56 of the pawl is made considerably heavier than end 58 by mounting a mass weight 60 at that end. End 58 overlaps the edge of disc 50 so that clockwise movement of the pawl 52 is stopped by end 58 abutting against the edge of disc 50. Counterclockwise movement of the pawl 52 is limited by the pin 62. Therefore, movement of the pawl is limited between the two maximum positions as indicated at 64 and 66.

Referring now to FIGURE 3, it is seen that a spiral spring 68 is located within the counterbored portion 20 of the boss 18. The inner end of this spiral spring 68 is securely fastened to the shaft 22. The outer end rides freely in the counterbore 20 and frictionally engages the same.

When the shaft 22 is rotated in a counterclockwise direction (as seen looking at FIGURE 2) by the motor 40, the disc 50 is turned and the pawl 52 strikes the stud or stop member 34 in a counterclockwise direction; end 58 of the pawl is forced under the stud 34 and assumes a position near that indicated at 66 in FIGURE 2. As the rotational speed of the disc 50 increases, the mass weight 60 tends to move outwardly away from the center of rotation due to centrifugal force, thus pivoting pawl 52 on pin 54 and forcing end 58 against the edge of disc 50. It may be clearly seen that at operational speed, which is a relatively high speed, the pawl 52 is held firmly in the position indicated at 66 and the end 58 of the pawl 52 will not strike the stud 34. Simultaneously, as the shaft 22 is rotated as just described, the spiral spring 68 becomes more tightly wound around shaft 22 and thereby stores energy until the force of this energy overcomes the friction produced between the outer end of the spring and the surface of the counterbore 20. At this time the outer end of the spring 68 begins to slide around the inside of the counterbore 20 and the energy stored is kept until the power to motor 40 is cut. When the motor 40 is cut off and the shaft 22 comes to rest, the spiral spring 68 causes the shaft 22 to rotate in reverse or in a clockwise direction (as seen looking at FIGURE 2) at a relatively low speed. As the disc 50 rotates in a clockwise direction at a slow rate the mass weight 60 assumes the lowest possible position and the pawl is held in a position as indicated at 64. It is seen in FIGURE 2 that the end 58 of pawl 52 will engage the stud or stop member 34 and since the pawl 52 cannot rotate past positiion 64 in a counterclockwise direction about pin 54 because of the limit pin 62, further reverse rotation of the disc 50 and shaft 22 is stopped. When the pawl 52 engages the stop member 34 and stops the shaft 22, there is still sufficient energy stored in the spiral spring 68 to hold the pawl 52 against the stud 34 and thus the rotatable shaft 22 is indexed. It can be appreciated that the stop member 34 must be located above the axis of rotation of disc 50 in order that the end 58 of pawl 52 will be disposed above the periphery of the disc in a position to engage the stop member.

Another embodiment of the invention is shown in FIGURES 4 and 5 which show a simplified means for stopping the rotation of shaft 22 at a predetermined position during a period of reverse or clockwise rotation of the shaft. This embodiment has the same structure and operates in the same manner as the device shown in FIGURE 1 except for the pawl and stop member arrangement. In this embodiment a pawl 70 is pivotally mounted on stud 34 on gear case 24. A coil spring 72 is wrapped about stud 34 and has a finger 74 positioned on top of pawl 70 for urging the pawl against the periphery of disc 50. The disc 50 is provided with an over-running tooth 76 having a shoulder 78. As can be seen in FIGURE 5, when shaft 22 and disc 50 are caused to rotate in a counterclockwise direction by motor 40, pawl 70 will ride over the entire peripheral surface of the disc. When the disc 50 is caused to rotate in the reverse direction by spiral spring 68, the shoulder 78 in the disc is engaged by pawl 70 and the disc is stopped and thus the rotatable shaft 22 is indexed. This embodiment has the advantage that the shaft 22 will be indexed regardless of the attitude of the housing 12.

While preferred embodiments of the invention have been described by way of illustration, it is pointed out that variations and modifications of the described embodiments may be made by those skilled in the art without departing from the scope of the invention as defined by the appended claim.

I claim:

An indexing device comprising a housing having a shaft rotatably mounted therein, means on said housing providing a friction surface adjacent said shaft, a spiral spring having its inner end fixed to said shaft and its outer end frictionally engaging said friction surface, driving means to rotate said shaft in one direction at relatively high speeds for winding said spiral spring tighter about said shaft to store energy in said spiral spring, said spiral spring being adapted to release the energy stored therein for rotating said shaft in a reverse direction at a relatively low speed when said driving means is inactivated and rotation of said shaft in said one direction stops, a disc mounted on said shaft and concentric therewith, a stop member on said housing near the periphery of said disc and extending into spaced overlying relationship to the periphery of said disc, a pawl, means pivotally mounting said pawl intermediate its ends on said disc near its periphery and for movement in a plane parallel to said disc, one end of said pawl overlapping the periphery of said disc and the other end having a weight thereon such that said pawl will lie contiguous to the periphery of said disc so as to clear said stop member when said shaft rotates in said one direction, due to centrifugal force acting on the weight at said other end of the pawl, said weight at the other end of said pawl causing said pawl to be pivoted due to the loss of centrifugal force acting on said weight such that said one end of the pawl is moved outwardly to a position in overlapping relation to said stop member so as to engage said stop member during a period of rotation of said shaft in said reverse direction, and limit means on said disc maintaining said one end of said pawl in said stop member engaging position during said period of reverse rotation of said shaft.

References Cited by the Examiner

UNITED STATES PATENTS

| 940,052 | 11/09 | Plant | 112—219 |
| 940,054 | 11/09 | Plant | 112—219 |
| 2,528,489 | 11/50 | Bednash et al. | 192—149 |
| 2,732,139 | 1/56 | Shaff. | |
| 2,884,685 | 5/59 | Bos et al. | |

FOREIGN PATENTS 246,865  5/26  Great Britain.

DAVID J. WILLIAMOWSKY, *Primary Examiner.*

THOMAS J. HICKEY, *Examiner.*